US010986961B2

(12) United States Patent
Yeh (10) Patent No.: US 10,986,961 B2
(45) Date of Patent: Apr. 27, 2021

(54) COLLAPSIBLE SUPPORT STAND (71) Applicant: Yehs Innovations Inc., Gilford (CA)

(72) Inventor: David Chien-Tuo Yeh, Gilford (CA)

(73) Assignee: Yehs Innovations Inc., Gilford (CA)

( * ) Notice: Subject to any disclaimer, the term of this patent is extended or adjusted under 35 U.S.C. 154(b) by 245 days.

(21) Appl. No.: 16/229,704

(22) Filed: Dec. 21, 2018

(65) Prior Publication Data
US 2020/0196797 A1 Jun. 25, 2020

(51) Int. Cl.
A47J 37/07 (2006.01)
A47J 37/06 (2006.01)

(52) U.S. Cl.
CPC ....... *A47J 37/0763* (2013.01); *A47J 37/0694* (2013.01); *A47J 2037/0777* (2013.01)

(58) Field of Classification Search
CPC ................ A47J 37/0763; A47J 37/0694; A47J 2037/0777; A47J 2037/0795; F24B 1/205; F24C 1/16; F24C 3/14; F24C 5/20; F24C 7/10
See application file for complete search history.

(56) References Cited

U.S. PATENT DOCUMENTS

| | | | | |
|---|---|---|---|---|
| 718,714 A * | 1/1903 | Larsen | ................. | A47J 37/067 248/439 |
| 1,054,188 A * | 2/1913 | Ehmann | ................. | F16M 11/00 248/165 |
| 1,309,049 A * | 7/1919 | Syrett | ................. | A47B 3/0815 248/439 |
| 1,532,912 A * | 4/1925 | McMahan | ............... | F24B 1/205 248/167 |
| 3,149,623 A * | 9/1964 | Orrjr | ................... | A47J 37/0763 126/9 R |
| 3,975,999 A * | 8/1976 | Carroll | ................ | A47J 37/0763 99/449 |
| 3,998,170 A * | 12/1976 | Gordon | .................. | A47B 45/00 108/91 |
| 4,178,844 A | 12/1979 | Ward et al. | | |
| 4,432,334 A | 2/1984 | Holt | | |
| 4,553,523 A * | 11/1985 | Stohrer, Jr. | ......... | A47J 37/0694 126/152 B |
| 4,941,568 A * | 7/1990 | Lapeyre | ................. | B65G 17/08 198/834 |
| 4,971,191 A * | 11/1990 | Lapeyre | ................. | B65G 17/08 198/853 |

(Continued)

*Primary Examiner* — Jorge A Pereiro
(74) *Attorney, Agent, or Firm* — Rowand LLP (57) ABSTRACT A collapsible support stand is disclosed. The support stand includes a first support section and a second support section. The first support section includes a first side frame and a plurality of first bars extending perpendicularly from the first side frame. The second support section includes a second side frame parallel to the first side frame, a first centre frame defining a plurality of holes, and a plurality of second bars extending between the second side frame and the first centre frame, wherein axial movement of the plurality of first bars through the plurality of holes moves the first support section between an extended position and a retracted position relative to the second support section. The support stand includes a pair of first foldable legs connected to the first side frame and a pair of second foldable legs connected to the second side frame.

10 Claims, 11 Drawing Sheets (56) References Cited

U.S. PATENT DOCUMENTS

| | | | | |
|---|---|---|---|---|
| 4,977,824 | A | * | 12/1990 | Shinier .................... A47J 33/00 |
| | | | | 126/25 R |
| 5,317,961 | A | * | 6/1994 | Shinier .................... A47J 33/00 |
| | | | | 126/25 R |
| 5,638,742 | A | * | 6/1997 | Kassaseya ............... A47J 43/18 |
| | | | | 211/181.1 |
| 6,131,560 | A | | 10/2000 | Healy |
| 6,189,527 | B1 | | 2/2001 | Walsh et al. |
| 6,681,759 | B2 | * | 1/2004 | Bentulan ............. A47J 37/0704 |
| | | | | 126/25 R |
| 7,931,139 | B2 | * | 4/2011 | Nielsen .................... B65G 17/24 |
| | | | | 198/851 |
| 2006/0102163 | A1 | * | 5/2006 | Sanders .................... F24B 1/205 |
| | | | | 126/30 |
| 2006/0272630 | A1 | | 12/2006 | Sanders et al. |
| 2010/0006083 | A1 | | 1/2010 | Educate et al. |
| 2010/0181270 | A1 | | 7/2010 | Miola |
| 2011/0073723 | A1 | * | 3/2011 | Ashpole ............. A47J 37/0694 |
| | | | | 248/176.2 |
| 2014/0251316 | A1 | * | 9/2014 | Unitas .................... A47J 33/00 |
| | | | | 126/9 B |

* cited by examiner

COLLAPSIBLE SUPPORT STAND

TECHNICAL FIELD

The present disclosure relates to a support structure and, in particular, to a collapsible support stand providing a level surface for supporting one or more objects.

BACKGROUND

Various support structures, such as barbecue grills and drying racks, include horizontal support surfaces that have a plurality of openings. For example, a plurality of spaced apart bars defining slotted openings may provide a horizontal support surface for such a structure. The openings may, for example, allow objects supported on the support surface to be exposed to an external heat source positioned underneath the support surface, or allow various substances (e.g. air, water, oil, etc.) to pass through the support surface.

It would be desirable to provide a support structure that is portable and that can be easily set up to provide a horizontal support surface having a plurality of openings.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present disclosure describes a collapsible support stand. The support stand includes: a first support section including: a first side frame; and a plurality of first bars positioned in spaced relation to each other and extending perpendicularly from the first side frame; a second support section including: a second side frame parallel to the first side frame; a first centre frame parallel to the second side frame, the first centre frame defining a plurality of holes that are sized and positioned to slidably receive the plurality of first bars therethrough, wherein axial movement of the plurality of first bars through the plurality of holes moves the first support section between an extended position and a retracted position relative to the second support section; and a plurality of second bars positioned in spaced relation to each other and extending between the second side frame and the first centre frame; a pair of first foldable legs pivotably connected at opposed ends of the first side frame; and a pair of second foldable legs pivotably connected at opposed ends of the second side frame, wherein each of the first side frame, the second side frame, and the first centre frame comprises a frame link assembly including a plurality of frame links connected in series, each frame link being pivotably connected to at least one adjoining frame link.

In some implementations, the support stand may also include, for at least one of the plurality of first bars, a stopper mounted on the at least one first bar for limiting axial movement of the at least one first bar away from the second side frame, the stopper having a size greater than a respective one of the plurality of holes on the first centre frame.

In some implementations, the first support section may also include a second centre frame parallel to the first side frame, the second centre frame defining a plurality of holes that are sized and positioned to slidably receive the plurality of second bars therethrough; and for at least one of the plurality of second bars, a stopper mounted on the at least one second bar for limiting axial movement of the at least one second bar away from the first side frame, the stopper being sized to catch against a respective one of the plurality of holes on the second centre frame.

In some implementations, at least one of the plurality of frame links may be pivotable to overlap an adjoining frame link.

In some implementations, the plurality of frame links may include two end links and one or more connecting links disposed between the two end links.

In some implementations, each of the first foldable legs may be pivotably connected to a respective end link of the first side frame and wherein each of the second foldable legs is pivotably connected to a respective end link of the second side frame.

In some implementations, each of the first and second foldable legs may comprise a leg link assembly including a plurality of leg links connected in series, each leg link being pivotably connected to at least one adjoining leg link.

In some implementations, the frame link assemblies of the first side frame, the second side frame, and the first centre frame may include corresponding frame links that are equal in length and positioned in horizontal alignment with each other.

In some implementations, for each of the frame link assemblies, at least one frame link may include a raised projection for engaging a retaining channel defined by a raised projection on an adjacent frame link such that when the raised projection is received in the retaining channel, the at least one frame link is releasably locked in a fixed position relative to the adjacent frame link.

In some implementations, for each of the frame link assemblies, at least one frame link may define a retaining groove for receiving a raised projection of an adjacent frame link such that when the raised projection is received in the retaining groove, the at least one frame link is releasably locked in a fixed position relative to the adjacent frame link.

In another aspect, the present disclosure describes a collapsible support stand. The support stand includes: a first support section including: a first side frame; and a plurality of first bars positioned in spaced relation to each other and extending perpendicularly from the first side frame, each of the plurality of first bars being affixed at a first end to the first side frame and having a stopper at a second opposite end; a second support section including: a second side frame; and a plurality of second bars positioned in spaced relation to each and extending perpendicularly from the second side frame, each of the plurality of second bars being affixed at a first end to the second side frame and having a slider portion defined at a second opposite end, wherein axial movement of the plurality of second bars in alignment with the plurality of first bars causes the slider portions to slide over corresponding ones of the plurality of first bars and moves the second support section between an extended position and a retracted position relative to the first support section; a pair of first foldable legs pivotably connected at opposed ends of the first side frame; and a pair of second foldable legs pivotably connected at opposed ends of the second side frame, wherein the slider portions are configured to catch against the stoppers for limiting axial movement of the plurality of second bars away from the first side frame and wherein each of the first side frame and the second side frame comprises a frame link assembly including a plurality of frame links connected in series, each frame link being pivotably connected to at least one adjoining frame link.

In some implementations, at least one of the plurality of frame links may be pivotable to overlap an adjoining frame link.

In some implementations, the plurality of frame links may include two end links and one or more connecting links disposed between the two end links.

In some implementations, each of the first foldable legs may be pivotably connected to a respective end link of the first side frame and wherein each of the second foldable legs is pivotably connected to a respective end link of the second side frame.

In some implementations, each of the first and second foldable legs may comprise a leg link assembly including a plurality of leg links connected in series, each leg link being pivotably connected to at least one adjoining leg link.

In some implementations, the frame link assemblies of the first side frame, the second side frame, and the first centre frame may include corresponding frame links that are equal in length and positioned in horizontal alignment with each other.

In some implementations, for each of the frame link assemblies, at least one frame link may include a raised projection for engaging a retaining channel defined by a raised projection on an adjacent frame link such that when the raised projection is received in the retaining channel, the at least one frame link is releasably locked in a fixed position relative to the adjacent frame link.

In some implementations, for each of the frame link assemblies, at least one frame link may define a retaining groove for receiving a raised projection of an adjacent frame link such that when the raised projection is received in the retaining groove, the at least one frame link is releasably locked in a fixed position relative to the adjacent frame link.

In some implementations, axial movement of the plurality of second bars may move the plurality of second bars in parallel alignment with the plurality of first bars.

In some implementations, the stopper may comprise a flared lip at the second end of the first bar.

Other example embodiments of the present disclosure will be apparent to those of ordinary skill in the art from a review of the following detailed descriptions in conjunction with the drawings.

In the present application, the term "and/or" is intended to cover all possible combination and sub-combinations of the listed elements, including any one of the listed elements alone, any sub-combination, or all of the elements, and without necessarily including additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1A:
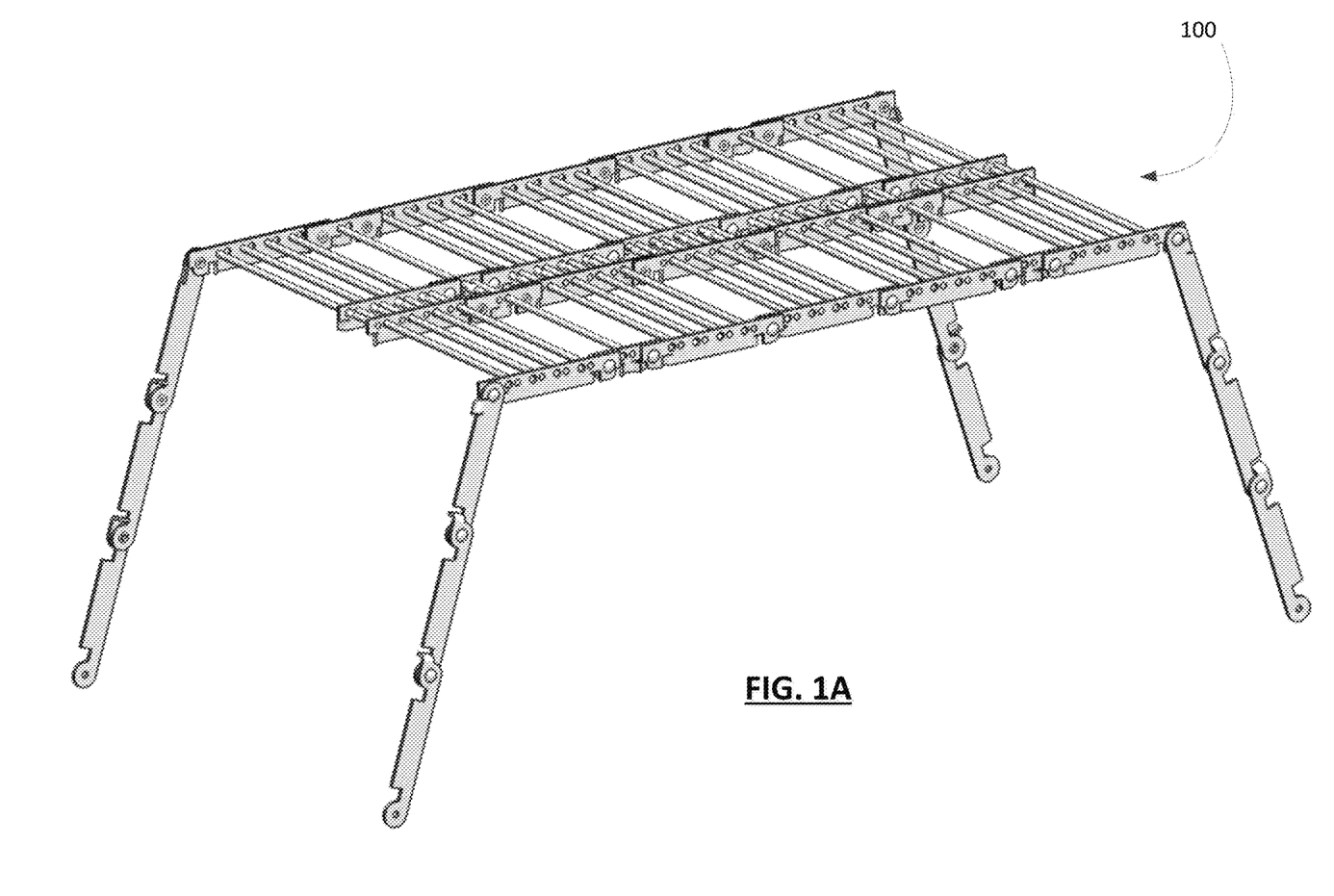
FIG. 1A is a perspective view of a collapsible support stand in accordance with an example embodiment of the present disclosure.
Figure 1B:
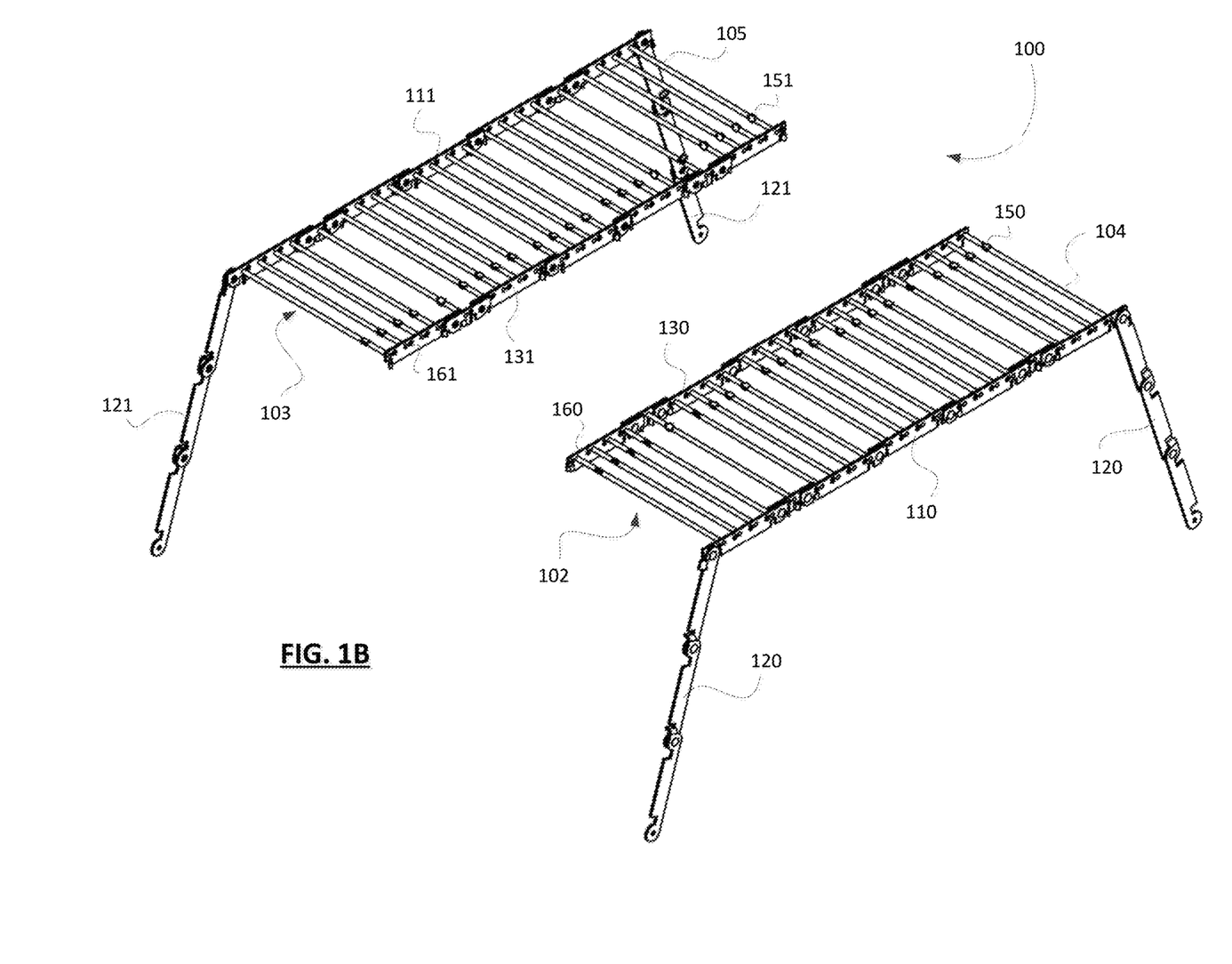
FIG. 1B is a perspective view showing two halves of the example collapsible support stand of FIG. 1A.

Reference is first made to FIGS. 1A and 1B, which show an example collapsible support stand 100. As will be apparent from its description, the support stand 100 provides a level surface on which one or more objects can be supported. In particular, the support stand 100 provides a support surface having a plurality of openings therethrough. The support stand 100 includes a first support section 103 and a second support section 102. The first support section 103 and the second support section 102 may be constructed of a durable material, such as aluminum, wood, or steel, and is capable of supporting a large amount of weight without significant deformation.

The first support section 103 includes a first side frame 111 and a plurality of first bars 105 that extend perpendicularly from the first side frame 111. The plurality of first bars 105 are positioned in parallel spaced relation to each other along the first side frame 111. For example, the distance between adjacent first bars 105 may be at least 0.5 centimeters. The plurality of first bars 105 may be in the form of elongate rods or panels.

The second support section 102 includes a second side frame 110 that is parallel to the first side frame 111 and a first center frame 130 that is parallel to the second side frame 110. The second support section 102 also includes a plurality of second bars 104 that extend perpendicularly from the second side frame 110. The plurality of second bars 104 are positioned in parallel spaced relation to each other along the second side frame 110. For example, the distance between adjacent second bars 104 may be at least 0.5 centimeters. The plurality of second bars 104 may be in the form of elongate rods or panels.

The first side frame 111 and the second side frame 110 define the side edges of a horizontal support surface for the support stand 100. As will be explained below, the first support section 103 and the second support section 102 cooperate to provide a support surface that is horizontally extendable in width. That is, the distance between the first side frame 111 and the second side frame 110 may be varied. When the width of the support surface is extended, the available surface area of the support surface increases, which, in turn, increases the support capacity of the support stand 100.

The first center frame 130 defines a plurality of holes 160. The holes 160 are sized and positioned to receive the plurality of first bars 105. In particular, the holes 160 are positioned on the first center frame 130 such that they align with positions of the plurality of first bars 105 on the first side frame 111. For example, the spacing between adjacent holes 160 may be equal to the spacing between adjacent ones of the plurality of first bars 105.

The alignment of the plurality of first bars 105 with the plurality of holes 160 enables sliding axial movement of the plurality of first bars 105 through the plurality of holes 160. This axial movement moves the first support section 103 between an extended position and a retracted position relative to the second support section 102. In particular, the support surface of the support stand 100 may be extended by sliding the plurality of first bars 105 away from the second side frame 110 through the plurality of holes 160. The support surface may be contracted by retracting the plurality of first bars 105 towards the second side frame 110 through the plurality of holes 160.

In the embodiment illustrated in FIG. 1B, the first support section 103 also includes a second center frame 131 that is parallel to the first side frame 111. The second center frame 131 defines a plurality of holes 161 that are sized and positioned to receive the plurality of second bars 104. In particular, the holes 161 are positioned on the second center frame 131 such that they align with positions of the plurality of second bars 104 on the second side frame 110. For example, the spacing between adjacent holes 161 may be equal to the spacing between adjacent ones of the plurality of second bars 104.

Figure 1C:
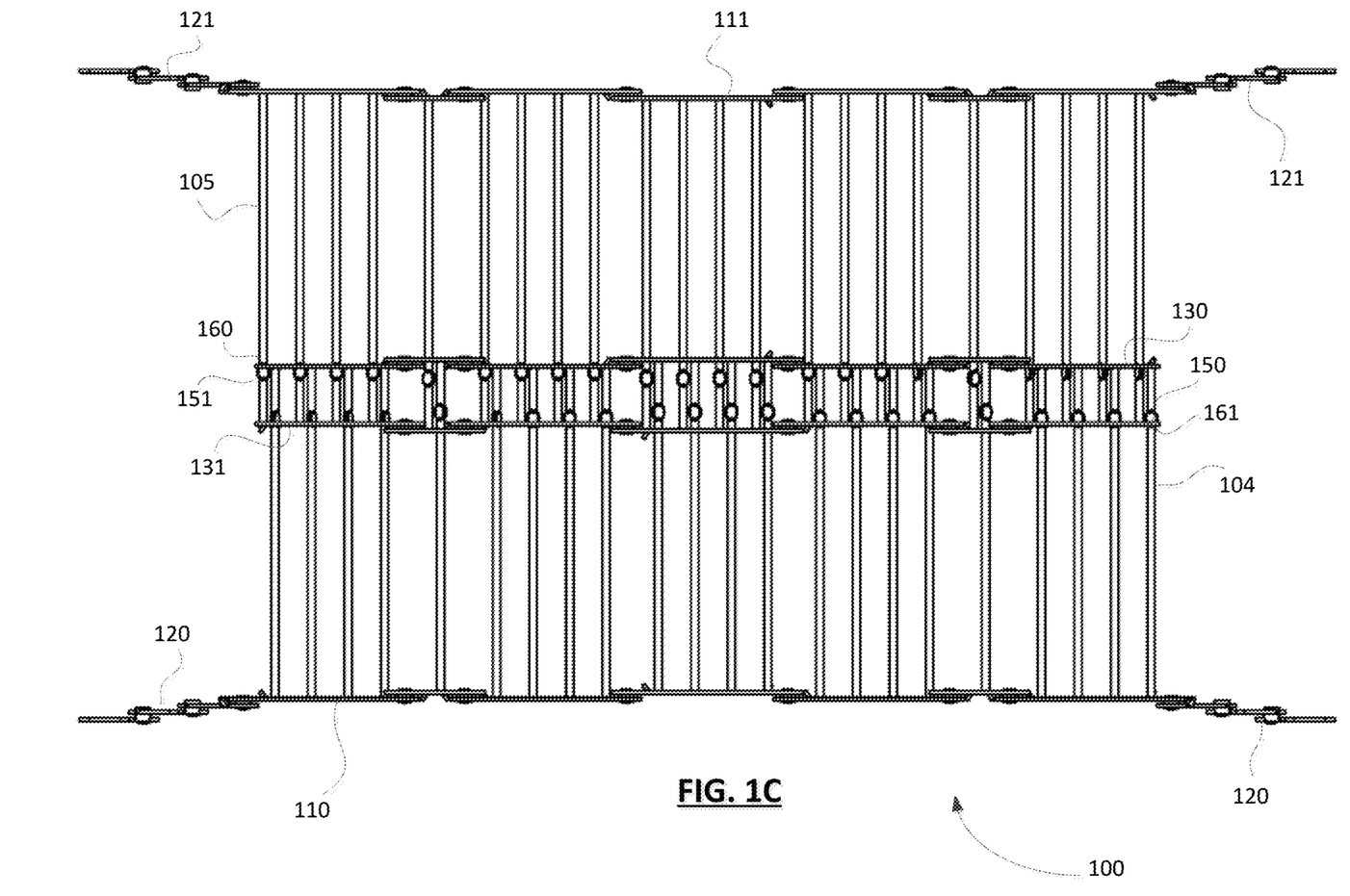
FIG. 1C is a top view of the example collapsible support stand of FIG. 1A.

FIG. 1C shows a top view of the support stand 100 in its assembled state. The plurality of first bars 105 are shown as being partially slid through the plurality of holes 160 on the first center frame 130, and the plurality of second bars 104 are shown as being partially slid through the plurality of holes 161 on the second center frame 131. The width of the support surface of support stand 100 can be controlled by sliding the plurality of first bars 105 and/or the plurality of second bars 104 through the plurality of holes 160 and 161, respectively.

The sliding axial movement of the plurality of first bars 105 and the plurality of second bars 104 may be limited to ensure that the bars do not slide out entirely through the plurality of holes 160 and 161, respectively. For example, the support stand 100 may include, for at least one of the plurality of first bars 105, a stopper 151 that is mounted on the at least one first bar 105 for limiting axial movement of the at least one first bar away from the second side frame 110. The stopper 151 may, for example, have a size greater than a respective hole 160 on the first center frame 130, causing the stopper 151 to catch against the first center frame 130 without sliding through the respective hole 160. As shown in FIG. 1C, the extent of axial movement of the plurality of first bars 105 away from the second side frame 110 is limited by the positions of the stoppers 151 on the plurality of first bars 105. That is, the positions of the stoppers 151 fix the amount by which the plurality of first bars 105 can slide and extend the support surface.

The axial movement of the plurality of second bars 104 may be similarly limited. As in the embodiment of FIG. 1C, for at least one of the plurality of second bars 104, a stopper 150 may be mounted on the at least one second bar 104 for limiting axial movement of the at least one second bar 104 away from the first side frame 111. The stopper 150 may, for example, have a size greater than a respective hole 161 on the second center frame 131, causing the stopper 150 to catch against the second center frame 131.

The configuration shown in FIG. 1C provides a central support region that reinforces the horizontal support capacity of the support stand 100. Specifically, the two center frames 130 and 131 cooperate to provide reinforcement for the plurality of first bars 105 and second bars 104 at the central region of the horizontal support surface of the support stand 100.

Returning to FIG. 1B, the support stand 100 also includes a pair of first foldable legs 121 connected at opposed ends of the first side frame 111 and a pair of second foldable legs 120 connected at opposed ends of the second side frame 110. In particular, the first foldable legs 121 are pivotably connected to the first side frame 111 and the second foldable legs 120 are pivotably connected to the second side frame 110. As shown in FIG. 1B, the first foldable legs 121 and the second foldable legs 120 are configured to support the first support section 103 and the second support section 102 such that the support sections collectively provide a horizontal support surface. In particular, the first foldable legs 121 and the second foldable legs 120 maintain the first and second support sections at a fixed vertical position, providing a stable, horizontal support surface.

Figure 2:
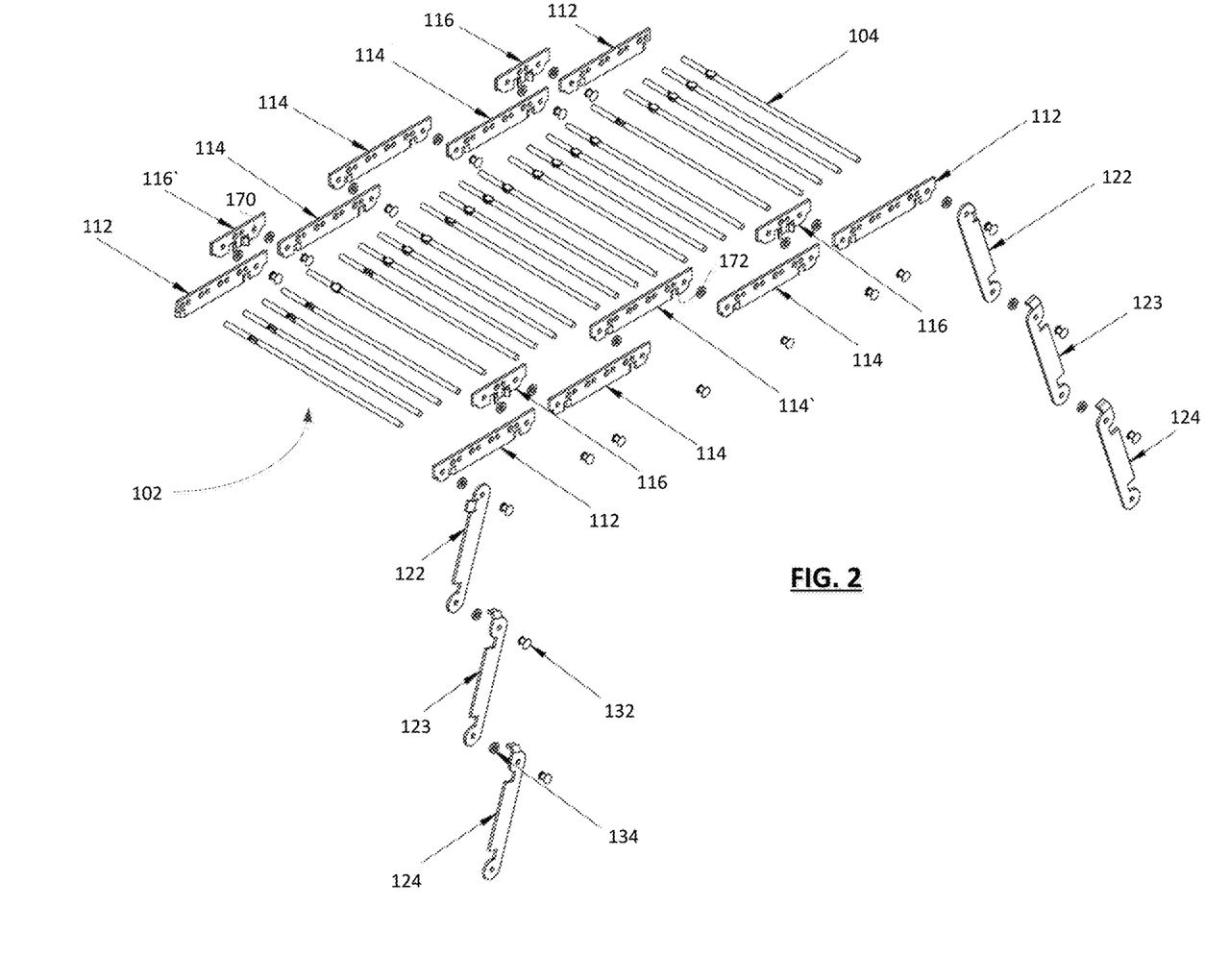
FIG. 2 is a partial exploded view of the example collapsible support stand of FIG. 1A.

Various components of the support stand 100 may be folded or collapsed to convert the support stand 100 to a compact form, facilitating portability of the support stand 100. Reference is now made to FIG. 2, which shows a partial exploded view of one half of the support stand 100. Each of the second side frame 110 and the first center frame 130 comprises a frame link assembly that includes a plurality of frame links connected in series. Each frame link is pivotably connected to at least one adjoining frame link. The frame links may, for example, include two end links and one or more connecting links disposed between the two end links. In FIG. 2, the first center frame 130 comprises a frame link assembly that includes two end links 112 and multiple connecting links 114 and 116. Similarly, the second side frame 110 comprises a link assembly that includes two end links 112 and multiple connecting links 114 and 116. Each end link 112 is pivotably connected to one adjoining connecting link 116, and each of the connecting links 114 and 116 is pivotably connected to two adjoining links (i.e. one pivotable connection at each of its two opposed ends).

Each frame link assembly includes two or more frame links. In at least some embodiments, the frame link assemblies may include an odd number of frame links. Similar to the second side frame 110 and the first center frame 130, each of the first side frame 111 and the second center frame 131 (not shown in FIG. 2) may comprise a frame link assembly that includes a plurality of frame links connected in series. In particular, the frame link assemblies of the first side frame 111, the second side frame 110, the first center frame 130, and the second center frame 131 may include corresponding frame links that are equal in length and positioned in horizontal alignment with each other. For example, corresponding end links 112 of the side frames and the center frames may be equal in length and aligned along the plane of the support surface. Similarly, corresponding connecting links 114 and 116 of the side frames and the center frames may have equal lengths and be positioned in horizontal alignment.

This arrangement of the frame links allows the support surface of support stand 100 to be folded into its compact form. For example, the first support section 103 may be folded by pivoting corresponding end links 112 of the first side frame 111 and second center frame 131 relative to their respective adjoining frame links, resulting in a first block, comprising the end links 112 and first bars 105 extending between the end links 112, "folding" or pivoting towards an adjacent second block (comprising two corresponding connecting links and first bars 105 extending therebetween) on the first support section 103. More specifically, the end links 112 may be pivoted to be perpendicular relative to their respective adjoining frame links to fold/pivot the first block towards the second block.

The first support section 103 can be folded, by pivoting a pair of corresponding frame links (from the first side frame 111 and second center frame 131) to be perpendicular to their respective adjoining frame links. In this way, each block comprising a pair of corresponding frame links and first bars 105 connecting said frame links can be folded/ pivoted towards an adjacent block of the first support section 103.

Similarly, the second support section 102 can be folded, by pivoting a pair of corresponding frame links from the second side frame 110 and first center frame 130 to be perpendicular to their respective adjoining frame links. Each block, comprising a pair of corresponding frame links and second bars 104 connecting said frame links, can then be folded towards an adjacent block of the second support section 102.

Figure 3A:
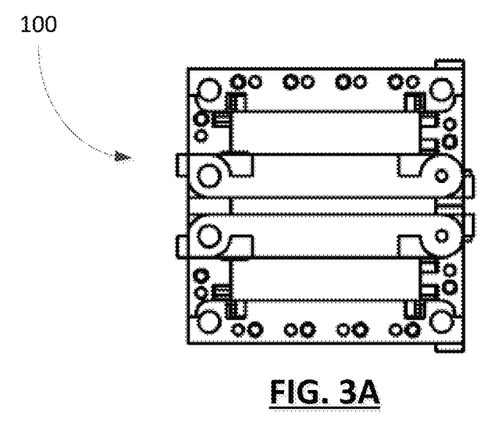
FIGS. 3A and 3B are side and top views of the example collapsible support stand of FIG. 1A in a folded configuration.
Figure 3B:
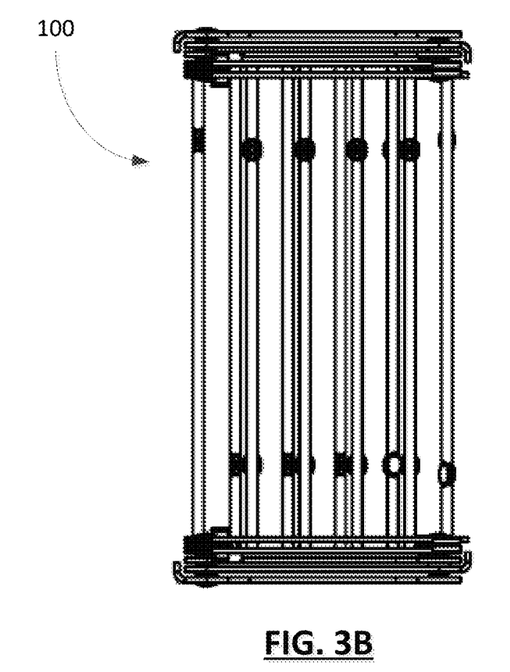

FIGS. 3A and 3B show the support stand 100 in a compact form. The side view of the compact form of support stand 100 shows the first and second support sections being folded by folding the blocks of the support sections towards their respective adjacent blocks. In FIG. 3B, a top view of a compact form of support stand 100 is shown. In the compact form, the first support section 103 is in a retracted position relative to the second support section 102. In particular, the first bars 105 are retracted to be at their closest point to, or in contact with, the second side frame 110. Similarly, in the compact form, the second bars 104 are at their closest point to, or in contact with, the first side frame 111. The compact/ collapsed form of the support stand 100 shown in FIGS. 3A and 3B may be suitable for carrying by a person or placing in an area with limited space.

Figure 1D:
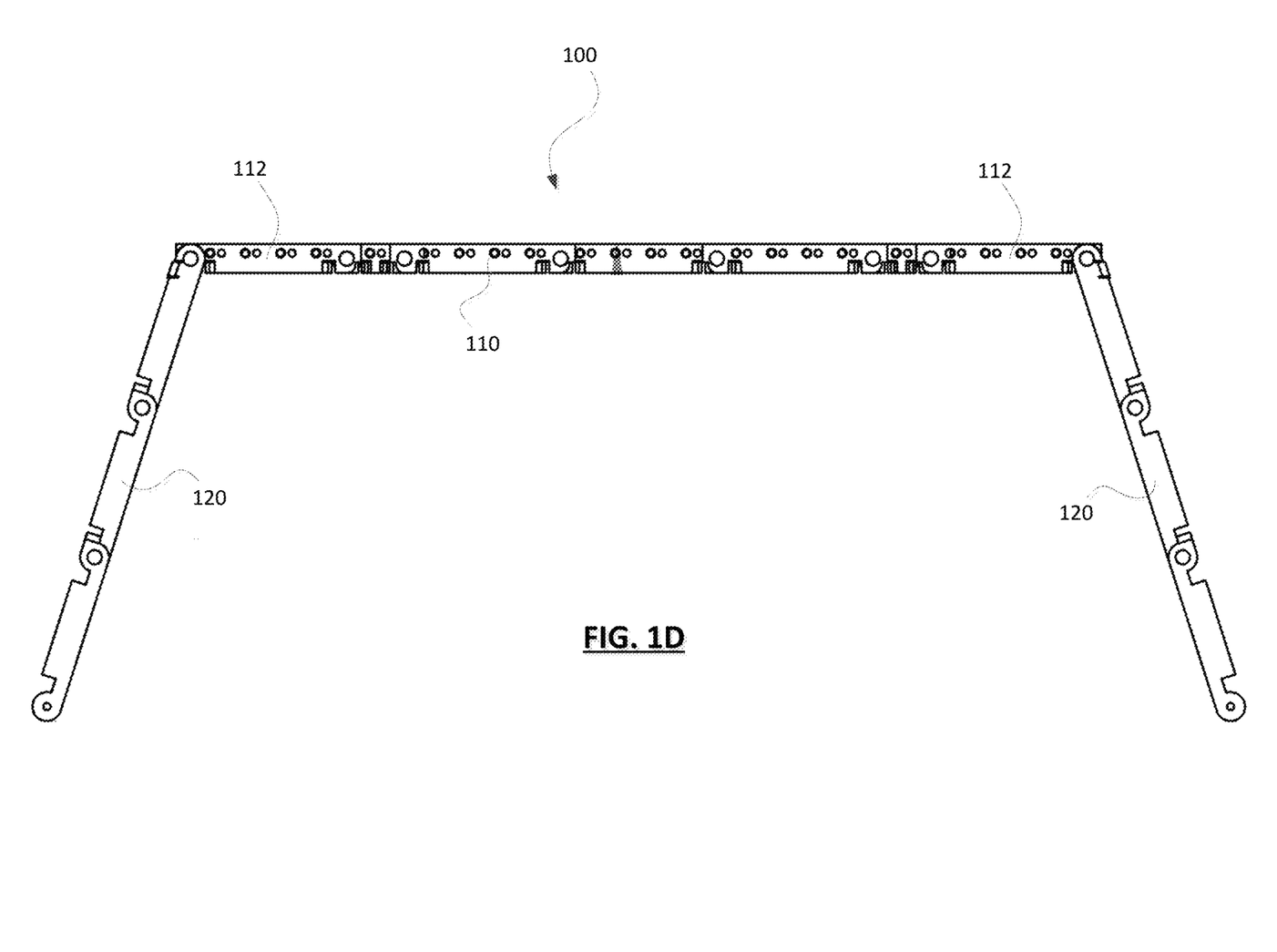
FIG. 1D is a side elevational view of the example collapsible support stand of FIG. 1A.

Reference is now made to FIG. 1D, which shows a side elevational view of the support stand 100, and FIG. 2. FIG. 1D shows the second side frame 110 and pair of second foldable legs 120. In at least some embodiments, each of the first foldable legs 121 is pivotably connected to a respective end link 112 of the first side frame 111 and each of the second foldable legs 120 is pivotably connected to a respective end link 112 of the second side frame 110.

The legs 120 and 121 are themselves foldable. Specifically, each of the first foldable legs 121 and second foldable legs 120 may comprise a leg link assembly that includes a plurality of leg links connected in series. The second foldable legs 120 in FIG. 2 each include a first link 122, a second link 123, and a third link 124. Each leg link is pivotably connected to at least one adjoining leg link. For example, first link 122 is pivotably connected to one other leg link, the second link 123, and the second link 123 is pivotably connected to two other leg links, the first link 122 and the third link 124. The first link 122 is also pivotably connected to an end link 112 of a frame link assembly, allowing the leg links to be pivoted to overlap ("folded over") the end link 112. The leg links of the first foldable legs 121 (not shown in FIG. 2) are similarly configured as the leg links of the second foldable legs 120.

The pivotable connections of the leg links allows the legs to be collapsed. In particular, each leg link in the leg link assemblies of the first and second foldable legs may be pivoted to overlap an adjacent leg link. For example, in a compact form of the support stand 100, the third link 124 may be pivoted to overlap (i.e. cover, or be aligned over) the second link 123, and the second link 123 and third link 124 may collectively be pivoted to overlap the first link 122. In this way, the leg links may be pivoted to overlap each other, allowing for reduction of the footprint of the support stand 100 in its compact form.

As can be seen in FIG. 1D, the support stand 100 is configured to be free-standing. The frame and leg link assemblies include mechanisms for maintaining the support stand 100 in a locked standing position. In at least some embodiments, for each of the frame link assemblies in support stand 100, at least one frame link includes a raised projection for engaging a retaining channel defined by a raised projection on an adjacent frame link. When the raised projection on the at least one frame link is received in the retaining channel, the at least one frame link is releasably locked in a fixed position relative to the adjacent frame link. Such a raised projection is shown in FIG. 2 as projection 170 on first center frame 130. The frame link 116' includes two raised projections 170 for engaging retaining channels defined on both adjacent frame links.

In at least some embodiments, for each of the frame link assemblies, at least one frame link defines a retaining groove for receiving a raised projection of an adjacent frame link such that when the raised projection is received in the retaining groove, the at least one frame link is releasably locked in a fixed position relative to the adjacent frame link. Such a retaining groove is shown in FIG. 2 as groove 172 on the second side frame 110. The frame link 114' includes two retaining grooves 172 for engaging raised projections defined on both adjacent frame links.

The raised projections and retaining grooves may be alternately defined on the frame links of frame link assemblies in order to facilitate securing the frame links in locked relative position with respect to adjacent frame links. Similarly, leg links of the leg link assemblies may define raised projections and retaining grooves for the purpose of maintaining the leg links in locked relative position with respect to adjacent leg links. When collapsing the support stand 100, the raised projections may be removed from retaining grooves/channels to release the frame and leg links from their locked relative positions.

Figure 4A:
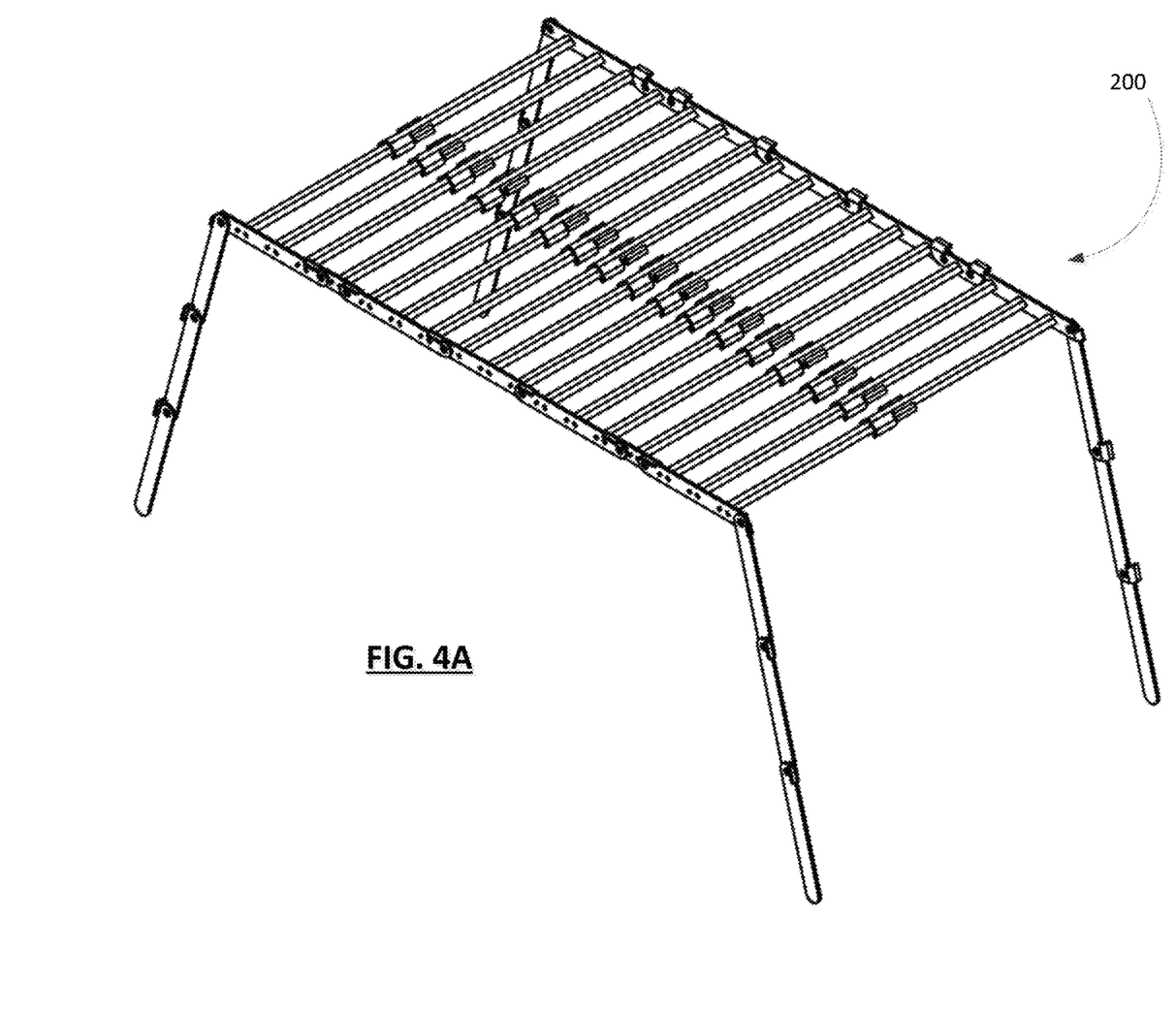
FIG. 4A is a perspective view of a collapsible support stand in accordance with another example embodiment of the present disclosure.
Figure 4B:
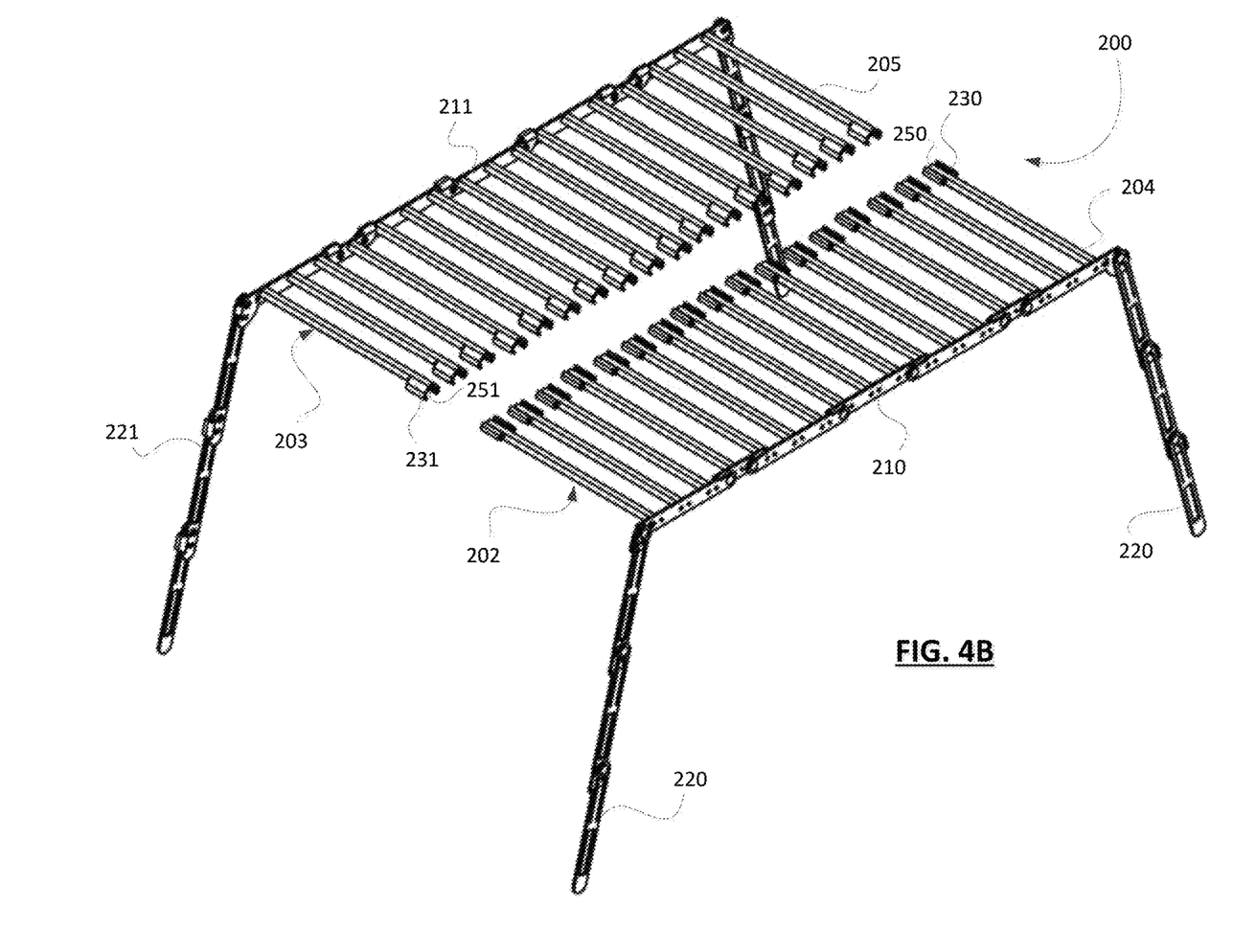
FIG. 4B is a perspective view showing two halves of the example collapsible support stand of FIG. 4A.

Reference is now made to FIGS. 4A and 4B, which show another example of a collapsible support stand 200. The support stand 200 provides a level surface on which one or more objects can be supported. In particular, the support stand 200 provides a support surface having a plurality of openings therethrough.

The support stand 200 includes a first support section 202 and a second support section 203. The first support section 202 and the second support section 203 may be constructed of a durable material, such as aluminum, wood, or steel, and is capable of supporting a large amount of weight without significant deformation.

The first support section 202 includes a first side frame 210 and a plurality of first bars 204 extending perpendicularly from the first side frame 210. The plurality of first bars 204 are positioned in spaced relation to each other along the first side frame 210, and each first bar 204 is affixed at its first end to the first side frame 210. Each first bar 204 has a stopper 230 at a second end 250 opposite to the first end. The plurality of first bars 204 may be in the form of elongate rods or panels.

The second support section 203 includes a second side frame 211 and a plurality of second bars 205 extending perpendicularly from the second side frame 211. The plurality of second bars 205 are positioned in spaced relation to each other along the second side frame 211, and each second bar 205 is affixed at its first end to the second side frame 211. Each second bar 205 has a slider portion 231 defined at a second end 251 opposite to the first end. The plurality of second bars 205 may be in the form of elongate rods or panels.

The first support section 202 is configured to be slidable with respect to the second support section 203. In particular, the plurality of second bars 205 are axially movable relative to the plurality of first bars 204. Specifically, axial movement of the plurality of second bars 205 in parallel alignment with the plurality of first bars 204 causes the slider portions 231 to slide over (or under) corresponding ones of the plurality of first bars 204, moving the second support section 203 between an extended position and a retracted position relative to the first support section 202. In this way, the sliding movement of the plurality of second bars 205 and/or the plurality of first bars 204 allows the distance (i.e. width) between the first side frame 210 and the second side frame 211 to be varied. When the width of the support surface is extended, the available surface area of the support surface increases, which, in turn, increases the support capacity of the support stand 200. The support surface may be extended by sliding the plurality of second bars 205 away from the first side frame 210, and contracted by sliding the plurality of second bars 205 towards the first side frame 210. Similarly, the support surface may be extended by sliding the plurality of first bars 204 away from the second side frame 211, and contracted by sliding the plurality of first bars 204 towards the second side frame 211.

As the plurality of first bars 204 and the plurality of second bars 205 provide the support surface of the support stand 200, the axial movement of the plurality of first bars 204 relative to the plurality of second bars 205 is limited to avoid the possibility of the first and second bars disengaging from (i.e. falling off) each other. The slider portions 231 are configured such that they catch against the stoppers 230 for limiting axial movement of the plurality of second bars 205 away from the first side frame 210. In some embodiments, a stopper on a first bar 204 may comprise a flared lip at the second end 250 that is sized and shaped to prevent a slider portion 231 of a corresponding second bar 205 to pass over it.

Similar to the support stand 100, the support stand 200 also includes a pair of first foldable legs 220 pivotally connected at opposed ends of the first side frame 210, and a pair of second foldable legs 221 pivotally connected at opposed ends of the second side frame 211.

Figure 5A:
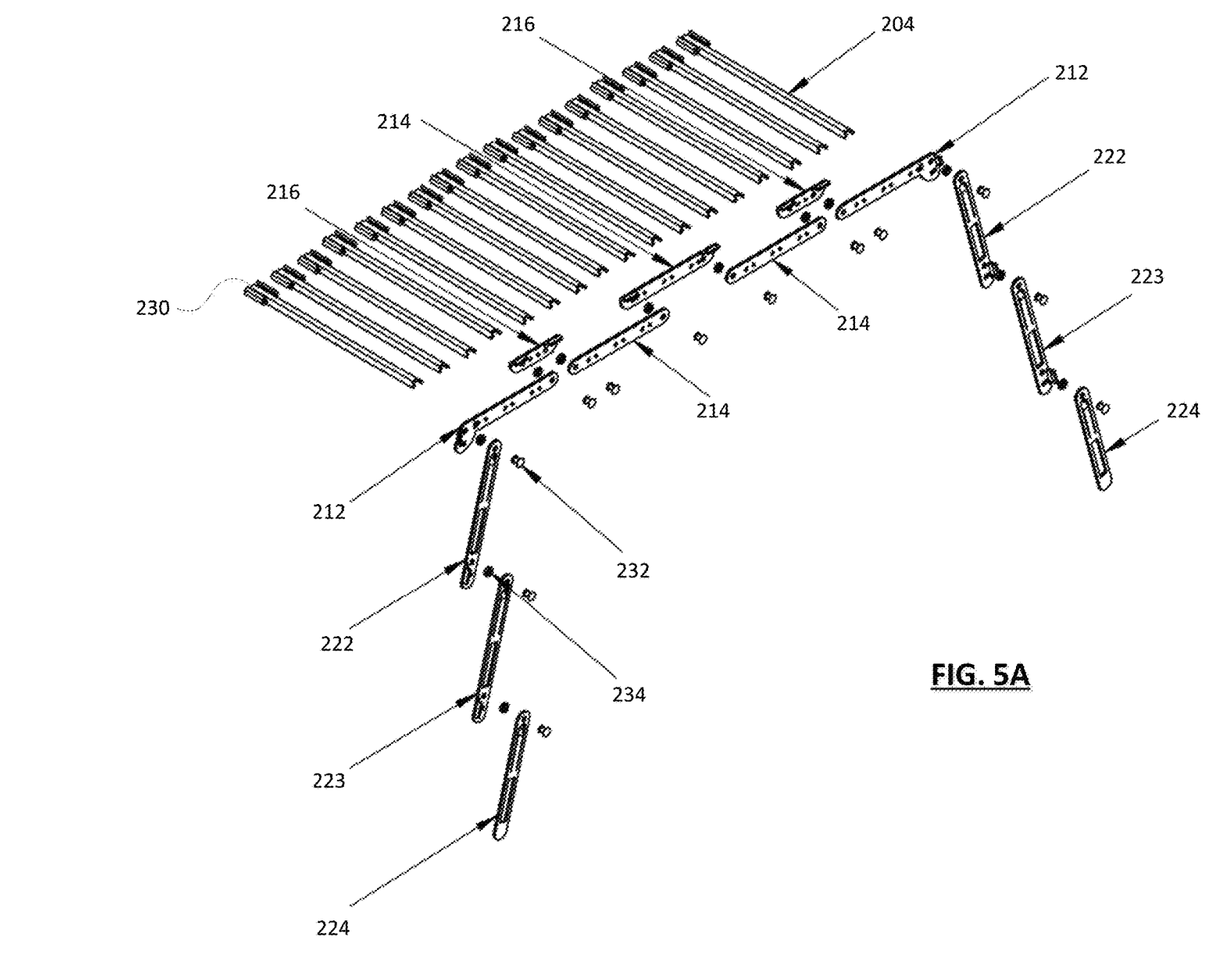
FIG. 5A is an exploded view of a first half of the example collapsible support stand of FIG. 4.

Various components of the support stand 200 may be folded or collapsed to convert the support stand 200 to a compact form, facilitating portability of the support stand 200. Reference is now made to FIG. 5A, which shows a partial exploded view of a first half of the support stand 200, and to FIG. 5B, which shows a partial exploded view of a second half of the support stand 200. In at least some embodiments, each of the first side frame 210 and the second side frame 211 may comprise a frame link assembly that includes a plurality of frame links connected in series. Each frame link is pivotably connected to at least one adjoining frame link. The frame links may, for example, include two end links 212 and one or more connecting links 214 and 216 disposed between the two end links. Each end link 212 is pivotably connected to one adjoining connecting link 216, and each of the connecting links 214 and 216 is pivotably connected to two adjoining links (i.e. one pivotable connection at each of its two opposed ends).

Figure 5B:
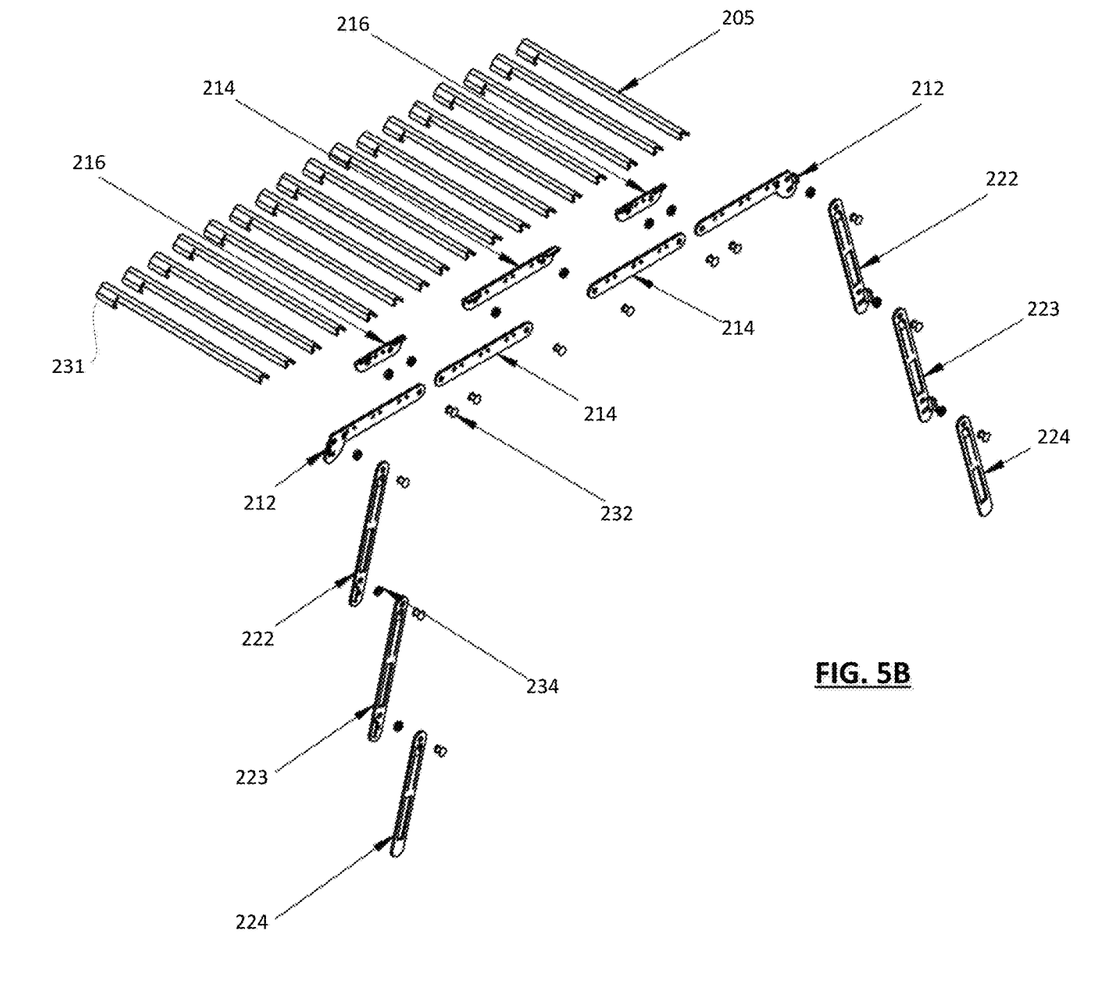
FIG. 5B is an exploded view of a second half of the example collapsible support stand of FIG. 4.

Each frame link assembly includes two or more frame links. The frame link assemblies of the first side frame 210 and the second side frame 211 may include corresponding frame links that are equal in length and aligned with each other. This configuration allows the support surface of support stand 200 to be folded in its compact form. For example, the first support section 202 and the second support section 203 may collectively be folded by pivoting corresponding end links 212 of the first side frame 210 and the second side frame 211 relative to their respective adjoining frame links, resulting in a first block comprising the end links 212 and first bars 204 and second bars 205 extending perpendicularly from the end link 112 "folding" or pivoting towards an adjacent second block (comprising a pair of corresponding connecting links and first and second bars 204 and 205 extending therefrom) on the first support section 202. More specifically, the end links 112 may be pivoted to be perpendicular relative to their respective adjoining frame links to fold/pivot the first block towards the second block.

Figure 6A:
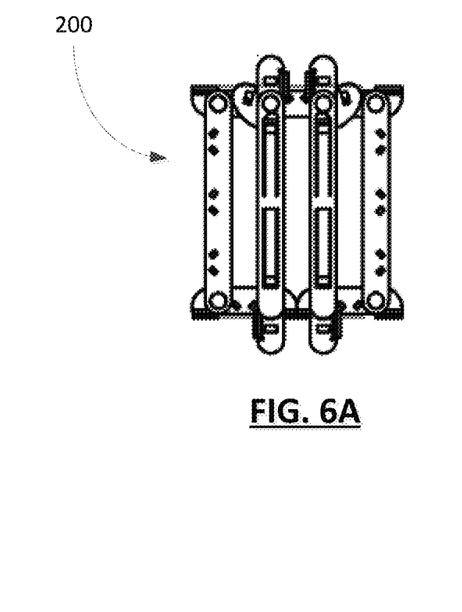
FIGS. 6A and 6B are side and top views of the example collapsible support stand of FIG. 4 in a folded configuration.
Figure 6B:
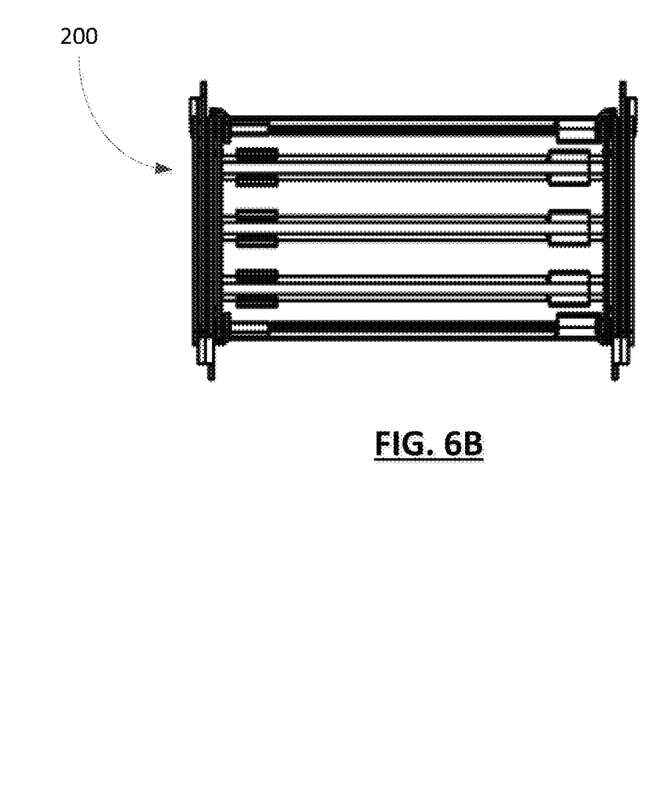

FIGS. 6A and 6B show the support stand 200 in a compact form. The side view of the compact form of support stand 200 shows the first and second support sections being folded by folding the blocks of the support sections towards their respective adjacent blocks. In FIG. 6B, a top view of a compact form of support stand 200 is shown. In the compact form, the first support section 202 is in a retracted position relative to the second support section 203. In particular, the first bars 204 are retracted to be at their closest point to, or in contact with, the second side frame 211. Similarly, in the compact form, the second bars 205 are at their closest point to, or in contact with, the first side frame 210. The compact/collapsed form of the support stand 200 shown in FIGS. 6A and 6B may be suitable for carrying by a person or placing in an area with limited space.

In at least some embodiments, each of the first foldable legs 220 is pivotably connected to a respective end link 212 of the first side frame 210 and each of the second foldable legs 221 is pivotably connected to a respective end link 112 of the second side frame 211. Similar to the support stand 100, the legs 220 and 221 of support stand 200 are themselves foldable. Specifically, each of the first foldable legs 220 and second foldable legs 221 may comprise a leg link assembly that includes a plurality of leg links connected in series. The first foldable legs 220 and the second foldable legs 221 each include a first link 222, a second link 223, and a third link 224. Each leg link is pivotably connected to at least one adjoining leg link. For example, first link 222 is pivotably connected to one other leg link, the second link 223, and the second link 223 is pivotably connected to two other leg links, the first link 222 and the third link 224. The first link 222 is also pivotably connected to an end link 212 of a frame link assembly, allowing the leg links to be pivoted to overlap ("folded over") the end link 212.

The pivotable connections of the leg links allow the legs to be collapsed. In particular, each leg link in the leg link assemblies of the first and second foldable legs may be pivoted to overlap an adjacent leg link.

The support stand 200 is configured to be free-standing. In at least some embodiments, for each of the frame link assemblies in support stand 200, at least one frame link includes a raised projection for engaging a retaining channel defined by a raised projection on an adjacent frame link. When the raised projection on the at least one frame link is received in the retaining channel, the at least one frame link is releasably locked in a fixed position relative to the adjacent frame link. In at least some embodiments, for each of the frame link assemblies, at least one frame link defines a retaining groove for receiving a raised projection of an adjacent frame link such that when the raised projection is received in the retaining groove, the at least one frame link is releasably locked in a fixed position relative to the adjacent frame link.

The raised projections and retaining grooves may be alternately defined on the frame links of frame link assemblies in order to facilitate securing the frame links in locked relative position with respect to adjacent frame links. Similarly, leg links of the leg link assemblies may define raised projections and retaining grooves for the purpose of maintaining the leg links in locked relative position with respect to adjacent leg links. When collapsing the support stand 200, the raised projections may be removed from retaining grooves/channels to release the frame and leg links from their locked relative positions.

In some embodiments, the two halves of support stand 100 shown in FIG. 1B and two halves of support stand 200 shown in FIG. 4B may be detachable. In particular, the support stands 100 and 200 may be disassembled into two halves that can independently be collapsed.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A collapsible support stand, comprising:
 a first support section including:
  a first side frame; and
  a plurality of first bars positioned in spaced relation to each other and extending perpendicularly from the first side frame;
 a second support section including:
  a second side frame parallel to the first side frame;
  a first centre frame parallel to the second side frame, the first centre frame defining a plurality of holes that are sized and positioned to slidably receive the plurality of first bars therethrough, wherein axial movement of the plurality of first bars through the plurality of holes moves the first support section between an extended position and a retracted position relative to the second support section; and
  a plurality of second bars positioned in spaced relation to each other and extending between the second side frame and the first centre frame;
 a pair of first foldable legs pivotably connected at opposed ends of the first side frame; and
 a pair of second foldable legs pivotably connected at opposed ends of the second side frame,
wherein each of the first side frame, the second side frame, and the first centre frame comprises a frame link assembly including a plurality of frame links connected in series, each frame link being pivotably connected to at least one adjoining frame link wherein a pair of corresponding frame links of the first side frame and the second side frame is pivotable to be oriented perpendicular to their respective adjoining frame links when the support stand is collapsed to a compact form, and
wherein the first foldable legs and the second foldable legs are pivotably connected to and overlap with the first side frame and the second side frame, respectively, when the support stand is collapsed to the compact form.

2. The support stand of claim 1, further comprising:
 for at least one of the plurality of first bars, a stopper mounted on the at least one first bar for limiting axial movement of the at least one first bar away from the second side frame, the stopper having a size greater than a respective one of the plurality of holes on the first centre frame.

3. The support stand of claim 1, wherein the first support section further includes:
 a second centre frame parallel to the first side frame, the second centre frame defining a plurality of holes that are sized and positioned to slidably receive the plurality of second bars therethrough; and
 for at least one of the plurality of second bars, a stopper mounted on the at least one second bar for limiting axial movement of the at least one second bar away from the first side frame, the stopper being sized to catch against a respective one of the plurality of holes on the second centre frame.

4. The support stand of claim 1, wherein at least one of the plurality of frame links is pivotable to overlap an adjoining frame link.

5. The support stand of claim 1, wherein the plurality of frame links include two end links and one or more connecting links disposed between the two end links.

6. The support stand of claim 5, wherein each of the first foldable legs is pivotably connected to a respective end link of the first side frame and wherein each of the second foldable legs is pivotably connected to a respective end link of the second side frame.

7. The support stand of claim 1, wherein each of the first and second foldable legs comprises a leg link assembly including a plurality of leg links connected in series, each leg link being pivotably connected to at least one adjoining leg link.

8. The support stand of claim 1, wherein the frame link assemblies of the first side frame, the second side frame, and the first centre frame include corresponding frame links that are equal in length and positioned in horizontal alignment with each other.

9. The support stand of claim 1, wherein, for each of the frame link assemblies, at least one frame link includes a raised projection for engaging a retaining channel defined by a raised projection on an adjacent frame link such that when the raised projection is received in the retaining channel, the at least one frame link is releasably locked in a fixed position relative to the adjacent frame link.

10. The support stand of claim 1, wherein, for each of the frame link assemblies, at least one frame link defines a retaining groove for receiving a raised projection of an adjacent frame link such that when the raised projection is received in the retaining groove, the at least one frame link is releasably locked in a fixed position relative to the adjacent frame link.

* * * * *